(12) United States Patent
Nanya et al.

(10) Patent No.: US 11,407,119 B2
(45) Date of Patent: Aug. 9, 2022

(54) SCRAPING DEVICE FOR JOINING MATERIAL AND METHOD FOR MANUFACTURING SEGMENT JOINT BODY

(71) Applicant: NGK INSULATORS, LTD., Nagoya (JP)

(72) Inventors: Daiki Nanya, Ichinomiya (JP); Jun Inoue, Kasugai (JP)

(73) Assignee: NGK Insulators, Ltd., Nagoya (JP)

( * ) Notice: Subject to any disclaimer, the term of this patent is extended or adjusted under 35 U.S.C. 154(b) by 0 days.

(21) Appl. No.: 17/126,129

(22) Filed: Dec. 18, 2020

(65) Prior Publication Data

US 2021/0276200 A1   Sep. 9, 2021

(30) Foreign Application Priority Data

Mar. 6, 2020   (JP) .............. JP2020-039075

(51) Int. Cl.
| | | |
|---|---|---|
| *B25J 11/00* | (2006.01) | |
| *G05D 1/00* | (2006.01) | |
| *F01N 3/022* | (2006.01) | |
| *B01D 46/24* | (2006.01) | |
| *B01D 46/00* | (2022.01) | |
| *B08B 1/00* | (2006.01) | |

(Continued)

(52) U.S. Cl.
CPC ....... *B25J 11/0085* (2013.01); *B01D 46/0001* (2013.01); *B01D 46/2418* (2013.01); *B08B 1/005* (2013.01); *B08B 1/006* (2013.01); *B08B 1/007* (2013.01); *B08B 1/02* (2013.01); *B08B 13/00* (2013.01); *C04B 38/0019* (2013.01); *F01N 3/0222* (2013.01); *G05D 1/0094* (2013.01); *B01D 2279/30* (2013.01); *F01N 2330/02* (2013.01)

(58) Field of Classification Search
None
See application file for complete search history.

(56) References Cited

U.S. PATENT DOCUMENTS

2006/0225833 A1   10/2006   Fujita et al.
2015/0217511 A1   8/2015   Ogle et al.

FOREIGN PATENT DOCUMENTS

CN   104853890 A   8/2015
CN   105817365 A   8/2016
(Continued)

OTHER PUBLICATIONS

Chinese Office Action (with English translation) dated Jun. 2, 2022 (Application No. 202011500279.1).

*Primary Examiner* — Eric W Golightly
(74) *Attorney, Agent, or Firm* — Burr & Brown, PLLC (57) ABSTRACT

A scraping device for undried joining material protruding from a segment joint body in which side surfaces of a plurality of pillar-shaped honeycomb structure segments are joined via the undried joining material, the segment joint body having an outer peripheral side surface, a first honeycomb-shaped end surface, and a second honeycomb-shaped end surface located on an opposite side of the first honeycomb-shaped end surface, the scraping device includes a stand for placing the segment joint body; a controller; and a scraping robot comprising at least one scraping spatula configured to be movable in at least one scraping direction along at least one surface of the outer peripheral side surface, the first honeycomb-shaped end surface, and the second honeycomb-shaped end surface while being pressed against the at least one surface.

18 Claims, 7 Drawing Sheets

(51) Int. Cl.
*B08B 1/02* (2006.01)
*B08B 13/00* (2006.01)
*C04B 38/00* (2006.01)

(56) References Cited

FOREIGN PATENT DOCUMENTS

| | | |
|---|---|---|
| JP | 2004-291270 A1 | 10/2004 |
| JP | 2005-154202 A1 | 6/2005 |
| JP | 2010-214781 A1 | 9/2010 |

FIG. 7A Scraping on outer peripheral side surface

FIG. 7B Scraping on end surface

FIG. 8

SCRAPING DEVICE FOR JOINING MATERIAL AND METHOD FOR MANUFACTURING SEGMENT JOINT BODY

FIELD OF THE INVENTION

The present invention relates to a device for scraping an undried joining material protruding from a segment joint body in which side surfaces of pillar-shaped honeycomb structure segments are joined via the joining material. The present invention also relates to a method for manufacturing a segment joint body.

BACKGROUND OF THE INVENTION

Particulate matter (hereinafter referred to as PM) in exhaust gas emitted from an internal combustion engine such as a diesel engine or a gasoline engine contains soot. Soot is harmful to the human body and its emission is regulated. At present, in order to comply with exhaust gas regulations, a filter having a pillar-shaped honeycomb structure, in which exhaust gas passes through breathable small pore partition walls to filtrate PM such as soot, is being widely used.

A filter having a pillar-shaped honeycomb structure may be used in the form of a segment joint body by joining the side surfaces of a plurality of pillar-shaped honeycomb structure segments with a joining material in order to improve thermal shock resistance. When joining pillar-shaped honeycomb structure segments with a joining material, excessive joining material applied to the side surface of each segment may protrude from the end surface and the side surface. There have been problems that the protruding joining material causes sinks and cracks on the surface and the inside of the joining material layer, and the joint force between the segments is lowered. Therefore, it has been conventionally practiced to scrape the protruding joining material before the joining material dries (Patent Literatures 1 to 3).

CITATION LIST

Patent Literature

[Patent Literature 1] Japanese Patent Application Publication No. 2004-291270
[Patent Literature 2] Japanese Patent Application Publication No. 2005-154202
[Patent Literature 3] Japanese Patent Application Publication No. 2010-214781

SUMMARY OF THE INVENTION

However, if the scraping work of the joining material is performed by humans, the production cost tends to increase. Moreover, in recent years, the labor shortage has become serious, and it is becoming difficult to secure workers. Therefore, it is desired to save labor for the scraping work of the joining material.

The present invention has been made in view of the above circumstances, and in one embodiment, an object of the present invention is to provide a device for scraping an undried joining material protruding from a segment joint body in which side surfaces of pillar-shaped honeycomb structure segments are joined via a joining material. In another embodiment, an object of the present invention is to provide a method for manufacturing a segment joint body using such a device.

[1]
A scraping device for an undried joining material protruding from a segment joint body in which side surfaces of a plurality of pillar-shaped honeycomb structure segments are joined via the undried joining material, the segment joint body having an outer peripheral side surface, a first honeycomb-shaped end surface, and a second honeycomb-shaped end surface located on an opposite side of the first honeycomb-shaped end surface,
the scraping device comprising:
a stand for placing the segment joint body;
a controller; and
a scraping robot comprising at least one scraping spatula configured to be movable in at least one scraping direction along at least one surface of the outer peripheral side surface, the first honeycomb-shaped end surface, and the second honeycomb-shaped end surface while being pressed against the at least one surface, the scraping robot being configured such that:
a pressing load of the scraping spatula against the at least one surface,
an angle formed by the scraping spatula and the at least one surface when the scraping spatula is pressed against the at least one surface, and
a speed at which the scraping spatula is moved in the at least one scraping direction along the at least one surface while being pressed against the at least one surface,
can be controlled by the controller.

[2]
The scraping device according to [1], wherein the pressing load is 5 N to 40 N, the angle is 30° to 150°, and the speed is 100 mm/sec to 500 mm/sec.

[3]
The scraping device according to [1] or [2], wherein the scraping spatula is made of a rubber having a shore hardness of 20 A to 90 A.

[4]
The scraping device according to any one of [1] to [3], wherein the scraping spatula has a thickness of 2 mm to 5 mm.

[5]
The scraping device according to any one of [1] to [4], wherein the scraping robot comprises a holding portion for fixing the scraping spatula, and the scraping spatula protrudes from the holding portion in a rectangular plate shape.

[6]
The scraping device according to [5], wherein a protrusion length of the scraping spatula from the holding portion is 40 mm to 80 mm.

[7]
The scraping device according to any one of [1] to [6], wherein the scraping robot is able to move the scraping spatula in the scraping direction such that a tip of the scraping spatula extends in a direction perpendicular to the scraping direction.

[8]
The scraping device according to any one of [1] to [7], wherein a width of the tip of the scraping spatula in the direction perpendicular to the scraping direction is equal to or longer than a maximum width of the first honeycomb-shaped end surface and the second honeycomb-shaped end surface in the direction perpendicular to the scraping direction.

[9]

The scraping device according to any one of [1] to [8], wherein the scraping spatula comprises a first scraping spatula for scraping the undried joining material protruding on the first honeycomb-shaped end surface and the second honeycomb-shaped end surface, and a second scraping spatula for scraping the undried joining material protruding on the outer peripheral side surface.

[10]

The scraping device according to [9], wherein the scraping spatula comprises a third scraping spatula smaller than both the first scraping spatula and the second scraping spatula, and a width of a tip of the third scraping spatula in the direction perpendicular to the scraping direction is equal to or shorter than a maximum width of the first honeycomb-shaped end surface and the second honeycomb-shaped end surface of each of the pillar-shaped honeycomb structure segments in the direction perpendicular to the scraping direction.

[11]

The scraping device according to [10], further comprising a camera configured to be able to capture at least one surface of the outer peripheral side surface, the first honeycomb-shaped end surface, and the second honeycomb-shaped end surface of the segment joint body placed on the stand, wherein the scraping robot can be controlled by the controller so as to discriminate a scraping leftover portion of the joining material on the at least one surface according to a predetermined standard based on an image of the at least one surface captured by the camera, and to perform an operation of scraping the undried joining material in the determined scraping leftover portion using the third scraping spatula.

[12]

The scraping device according to any one of [1] to [11], wherein the scraping robot is an articulated robot comprising a wrist portion for attaching the scraping spatula, and an arm with the wrist portion attached to a tip of the arm, and the scraping robot is configured such that by controlling postures of the wrist portion and the arm, a coordinate at which the scraping spatula is located, the pressing load, the angle, and the speed can be controlled by the controller.

[13]

The scraping device according to any one of [1] to [12], further comprising a wire for rubbing off the joining material adhering to the scraping spatula, wherein the scraping robot can be controlled by the controller so as to perform an operation of rubbing the scraping spatula against the wire.

[14]

The scraping device according to any one of [1] to [13], wherein the stand is configured to be rotatable.

[15]

The scraping device according to any one of [1] to [14], wherein the at least one scraping direction includes two directions orthogonal to each other.

[16]

The scraping device according to any one of [1] to [15], further comprising a circulation traveling type conveyor for transporting the stand.

[17]

The scraping device according to [16], further comprising a cleaning robot having a wiping portion configured to be able to wipe a placement surface of the stand on a circulation traveling-type conveyor while pressing the wiping portion against the placement surface.

[18]

A method for manufacturing a segment joint body, comprising:

a step of placing on the stand a segment joint body in which side surfaces of a plurality of pillar-shaped honeycomb structure segments are joined via an undried joining material, the segment joint body having an outer peripheral side surface, a first honeycomb-shaped end surface, and a second honeycomb-shaped end surface located on an opposite side of the first honeycomb-shaped end surface;

a step of scraping the undried joining material protruding from the segment joint body using the scraping device according to any one of [1] to [17] to control a pressing load of the scraping spatula against at least one surface of the outer peripheral side surface, the first honeycomb-shaped end surface, and the second honeycomb-shaped end surface of the segment joint body placed on the stand, an angle formed by the scraping spatula and the at least one surface when the scraping spatula is pressed against the at least one surface, and a speed at which the scraping spatula is moved in the at least one scraping direction along the at least one surface while being pressed against the at least one surface under predetermined conditions; and a step of drying the undried joining material after the step of scraping the joining material.

According to one embodiment of the scraping device for a joining material of the present invention, it is possible to save labor for the scraping work of the joining material. Therefore, the manpower required for scraping the joining material can be suppressed, and it is possible to contribute to reduction of the manufacturing cost of segment joint bodies.

DETAILED DESCRIPTION OF THE INVENTION

Hereinafter, embodiments of the present invention will be described in detail with reference to the drawings. It should be understood that the present invention is not limited to the following embodiments, and any change, improvement or the like of the design may be appropriately added based on ordinary knowledge of those skilled in the art without departing from the spirit of the present invention.

(1. Pillar-shaped Honeycomb Structure Segment)

Figure 1:
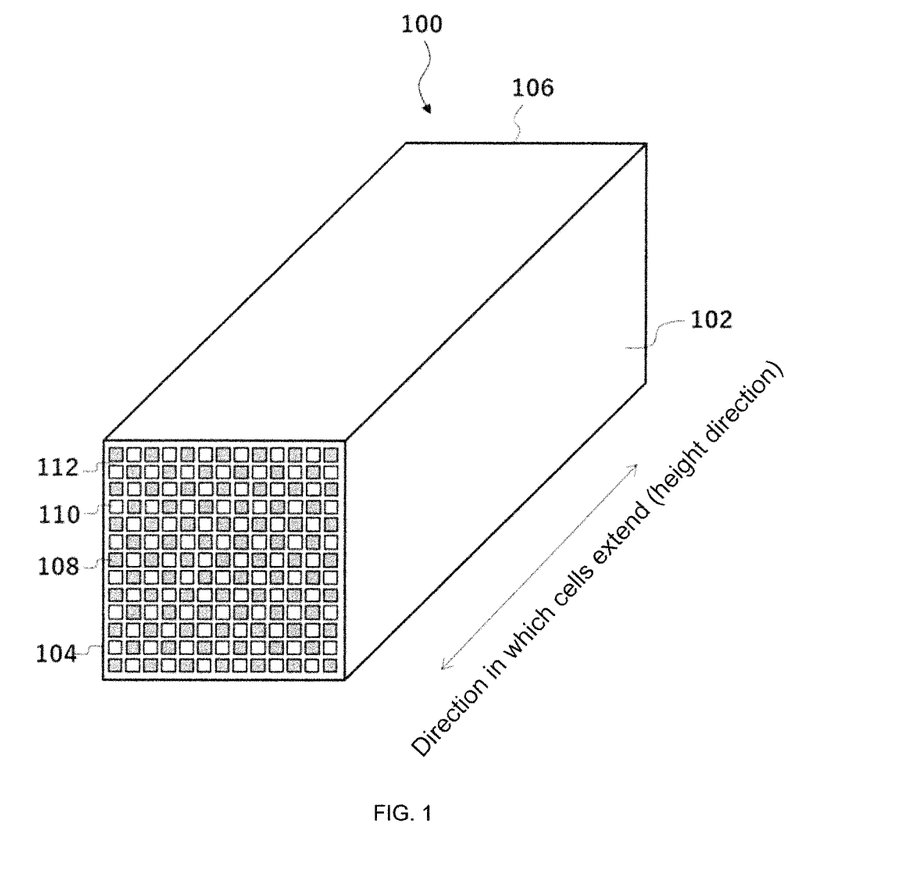
FIG. 1 is a schematic perspective view of a pillar-shaped honeycomb structure segment according to one embodiment of the present invention.
Figure 2:
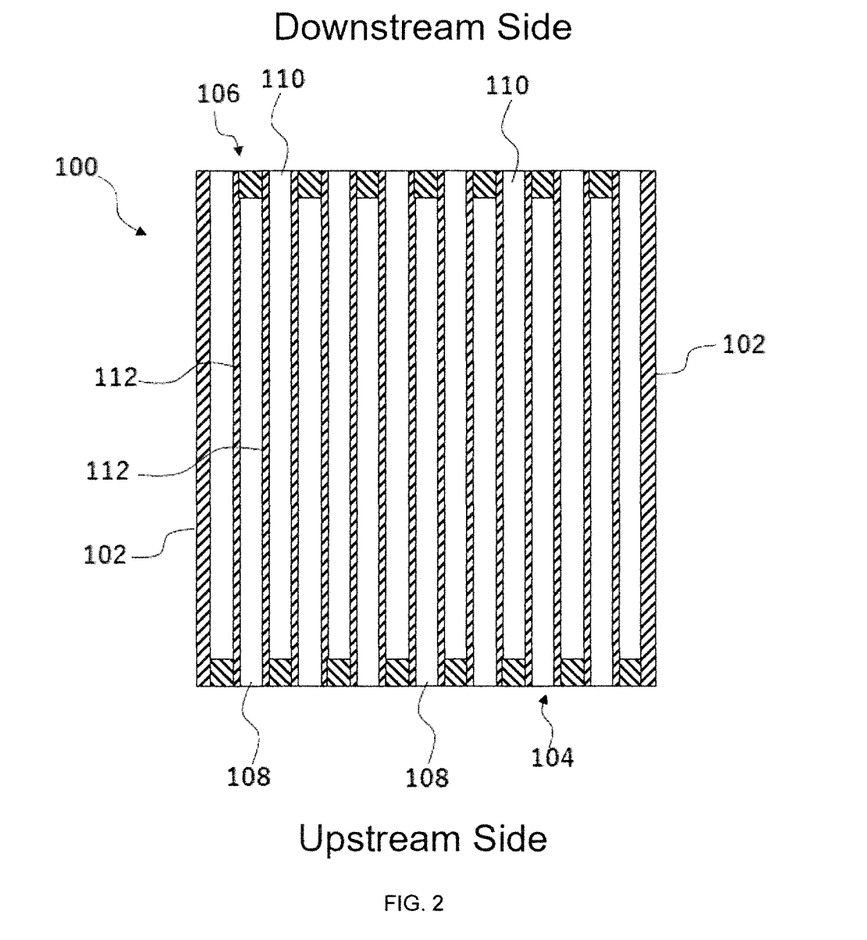
FIG. 2 is a schematic cross-sectional view of a pillar-shaped honeycomb structure segment according to one embodiment of the present invention when observed from a cross-section parallel to the direction in which the cells extend.

FIG. 1 shows a schematic perspective view of a pillar-shaped honeycomb structure segment 100 according to one embodiment of the present invention. FIG. 2 shows a schematic cross-sectional view of the pillar-shaped honeycomb structure segment 100 according to one embodiment of the present invention when observed from a cross-section parallel to the direction in which the cells extend.

The pillar-shaped honeycomb structure segment 100 comprises a honeycomb structure having a side surface 102, and porous partition walls 112 provided inside the side surface 102, the partition walls 112 partitioning a plurality of cells 108, 110 extending from a first honeycomb-shaped end surface 104 to a second honeycomb-shaped end surface 106. Each cell 108, 110 may be penetrated through from the first honeycomb-shaped end surface 104 to the second honeycomb-shaped end surface 106 by opening both the first honeycomb-shaped end surface 104 and the second honeycomb-shaped end surface 106. However, in order to improve the collection performance of PM, the pillar-shaped honeycomb structure segment 100 preferably comprises a plurality of first cells 108 extending from the first honeycomb-shaped end surface 104 to the second honeycomb-shaped end surface 106 with the first honeycomb-shaped end surface 104 being opened and the second honeycomb-shaped end surface 106 being sealed, and a plurality of second cells 110 extending from the first honeycomb-shaped end surface 104 to the second honeycomb-shaped end surface 106 with the first honeycomb-shaped end surface 104 being sealed and the second honeycomb-shaped end surface 106 being opened. In this case, in the pillar-shaped honeycomb structure segment 100, the first cells 108 and the second cells 110 can be alternately arranged adjacent to each other with the partition wall 112 interposed therebetween so that both end surfaces have a checkered pattern.

When the exhaust gas containing soot is supplied to the first honeycomb-shaped end surface 104 which is on the upstream side of the pillar-shaped honeycomb structure segment 100, the exhaust gas is introduced into the first cells 108 and proceeds downstream in the first cells 108. Since the first cells 108 are sealed on the second honeycomb-shaped end surface 106 which is on the downstream side, the exhaust gas pass through the porous partition walls 112 partitioning the first cells 108 and the second cells 110 and flows into the second cells 110. Since soot cannot pass through the partition walls 112, it is collected and deposited in the first cells 108. After the soot is removed, the clean exhaust gas that has flowed into the second cells 110 proceeds downstream in the second cells 110 and flows out of the second honeycomb-shaped end surface 106 which is on the downstream side.

The outer shape of the pillar-shaped honeycomb structure segment 100 is not particularly limited as long as it is pillar-shaped. For example, the end surface can be a polygonal pillar shape. Examples of the polygon include a quadrangle (rectangle, square, and the like), a hexagon, and the like. In a typical embodiment, the outer shape of the pillar-shaped honeycomb structure segment 100 can be a quadrangular prism shape. In addition, the size of the pillar-shaped honeycomb structure segment 100 can be, for example, 100 to 3600 $mm^2$, and typically 400 to 2500 $mm^2$ in the area of the end surface. The length (height) of the pillar-shaped honeycomb structure segment 100 in the direction in which the cells extend can be, for example, 100 to 500 mm, and typically 120 to 400 mm.

There is no limitation on the shape of the cells in the cross-section orthogonal to the extending direction (height direction) of the first cells 108 and the second cells 110. However, it is preferably a quadrangle, a hexagon, an octagon, or a combination thereof. Among these, squares and hexagons are preferable. By making the shape of the cells in this way, when the pillar-shaped honeycomb structure segment 100 is used as a particulate filter, the pressure loss when the exhaust gas flows is reduced, and the purification performance is excellent.

Examples of the material of the pillar-shaped honeycomb structure segment 100 include, but are not limited to, porous ceramics. Examples of ceramics include cordierite, mullite, zirconium phosphate, aluminum titanium, silicon carbide, silicon-silicon carbide composite (for example, Si bonded SiC), cordierite-silicon carbide composite, zirconia, spinel, indialite, sapphirine, corundum, titania, silicon nitride, and the like. Further, as the ceramics, one type may be used alone, or two or more types may be used in combination. Examples of other materials of the pillar-shaped honeycomb structure segment 100 include a porous sintered metal comprising an alloy component containing one or more selected from the group consisting of Fe, Cr, Mo, and Ni as the main component.

The pillar-shaped honeycomb structure segment can be manufactured according to known methods for manufacturing a honeycomb structure, and the procedure is exemplified as below. First, a green body comprising a predetermined ceramics raw material, a dispersion medium, a pore-forming material and a binder is prepared. Next, the green body is extruded to prepare a honeycomb formed body. During extrusion, a die having a desired overall shape, cell shape, partition wall thickness, cell density and the like can be used. The method of sealing the end surfaces of the honeycomb formed body is not particularly limited, and well-known methods such as filling with a sealing slurry the cell openings of the end surface to which a predetermined mask is attached can be adopted. After that, a pillar-shaped honeycomb structure segment can be prepared by sequentially performing degreasing and firing of the dried honeycomb formed body. As the degreasing and firing conditions, any known conditions may be adopted depending on the material of the segment, and there is no particular limitation.

(2. Segment Joint Body)

Figure 3A:
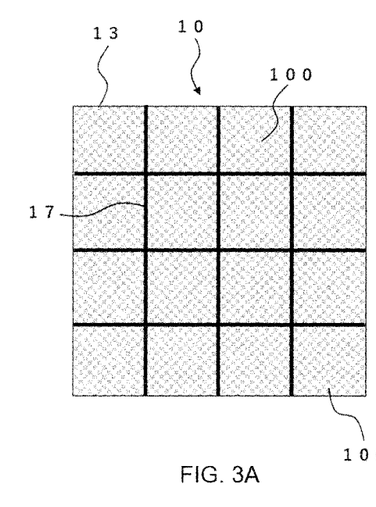
FIG. 3A is a schematic end view of a segment joint body according to one embodiment of the present invention.
Figure 3B:
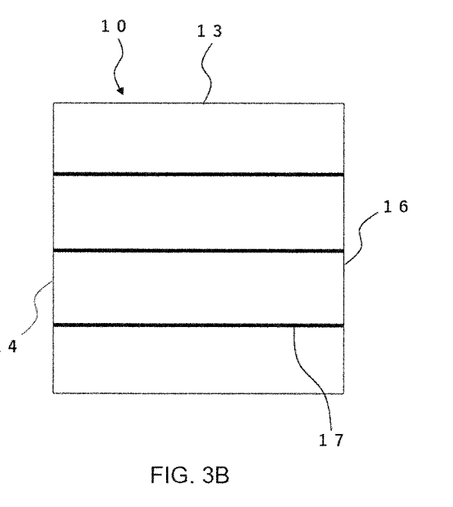
FIG. 3B is a schematic side view of a segment joint body according to one embodiment of the present invention.

FIG. 3 shows a schematic end view (3A) and side view (3B) of a segment joint body 10 according to one embodiment of the present invention. The segment joint body 10 has a structure in which the side surfaces of a plurality of pillar-shaped honeycomb structure segments 100 are joined via a joining material 17. By joining a plurality of pillar-shaped honeycomb structure segments and providing them as a segment joint body, the thermal shock resistance can be enhanced. The segment joint body 10 has an outer peripheral side surface 13, a first honeycomb-shaped end surface 14, and a second honeycomb-shaped end surface 16 located on the opposite side of the first honeycomb-shaped end surface 14.

The segment joint body can be manufactured, for example, by the following procedure. A joining material is applied to the joining surfaces (side surfaces) of each of the pillar-shaped honeycomb structure segments with a film for preventing adhesion of the joining material attached to both end surfaces. Next, these segments are arranged adjacent to each other so that the side surfaces of the segments face each other, and the adjacent segments are crimped to each other. After crimping, the undried joining material protruding from at least one surface of the outer peripheral side surface, the first honeycomb-shaped end surface and the second honeycomb-shaped end surface of the segment joint body is scraped, and then the segment joint body is heated for drying. Here, the undried joining material refers to a joining material in which the water weight in the joining material is 10 wt % to 40 wt %. After drying, the film for preventing adhesion of the joining material is peeled off. In this way, a segment joint body in which the side surfaces of adjacent segments are joined by a joining material is prepared.

The material of the film for preventing adhesion of the joining material is not particularly limited, but synthetic resins such as polypropylene (PP), polyethylene terephthalate (PET), polyimide, and Teflon (registered trademark) can be preferably used. Further, the film preferably has an adhesive layer, and the material of the adhesive layer is preferably an acrylic resin, a rubber resin (for example, rubber containing natural rubber or synthetic rubber as a main component), or a silicone resin.

As an example of the joining material, a material (cement) prepared by mixing a ceramics powder, a dispersion medium (for example, water and the like) and, if necessary, additives such as a binder, a peptizing agent, and a foamed resin can be used. Examples of ceramics include cordierite, mullite, zirconium phosphate, aluminum titanium, silicon carbide, silicon-silicon carbide composite (for example, Si bonded SiC), cordierite-silicon carbide composite, zirconia, spinel, indialite, sapphirine, corundum, titania, silicon nitride, and the like. It is more preferable that the material is the same as that of the pillar-shaped honeycomb structure segment. Examples of the binder include polyvinyl alcohol and methyl cellulose.

Figure 4A:
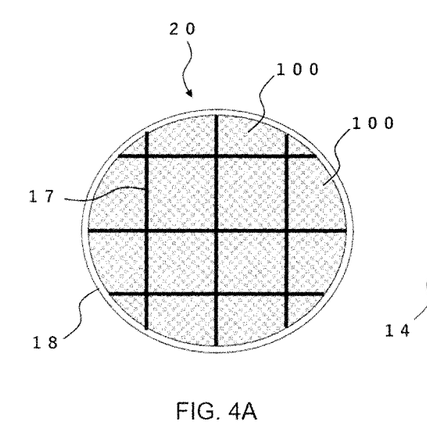
FIG. 4A is a schematic end view of a segment joint body according to another embodiment of the present invention.
Figure 4B:
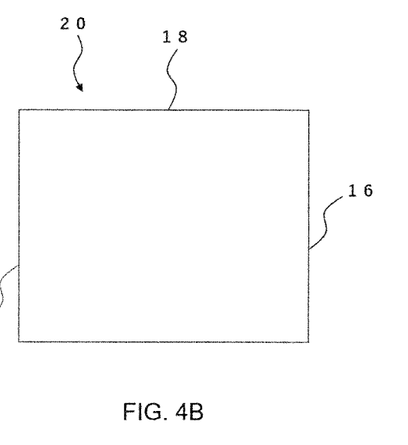
FIG. 4B is a schematic side view of a segment joint body according to another embodiment of the present invention.

Further, the segment joint body 10 may be finished in a desired shape (for example, a cylindrical shape) by grinding the outer peripheral side surface 13 as desired. In this case, it is preferable to apply a coating material to the outer peripheral side surface 13 of the segment joint body 10 after grinding, and then form the outer peripheral wall 18 by drying and heat treatment. FIG. 4 shows a schematic end view (4A) and side view (4B) of the segment joint body 20 according to another embodiment of the present invention manufactured after grinding and formation of the outer peripheral wall 18.

The coating material is not particularly limited, and known outer peripheral coating materials can be used. The outer peripheral coating material may be for instance in the form of slurry made by adding additives such as organic binders, foamed resins, and dispersants as well as water to inorganic raw materials such as inorganic fibers, colloidal silica, clay, and ceramic particles, and then kneading the mixture. Further, the coating method of the outer peripheral coating material is not particularly limited, and known methods can be used.

The segment joint body can be used, for example, as filter (GPF, DPF, and the like) for the particulate in exhaust gas of an internal combustion engine, a boiler, and the like; a catalyst carrier; and a heat exchanger.

(3. Scraping Device for Joining Material)

According to one embodiment of the present invention, there is provided a device for carrying out operation of scraping an undried joining material protruding from a segment joint body in the manufacturing process of the segment joint body (a scraping device for a joining material).

Accordingly, in one embodiment of the present invention, there is provided a method for manufacturing a segment joint body, comprising:

a step of placing on the stand a segment joint body in which side surfaces of a plurality of pillar-shaped honeycomb structure segments are joined via an undried joining material, the segment joint body having an outer peripheral side surface, a first honeycomb-shaped end surface, and a second honeycomb-shaped end surface located on an opposite side of the first honeycomb-shaped end surface;

a step of scraping the undried joining material protruding from the segment joint body using the scraping device for the joining material to control a pressing load of the scraping spatula against at least one surface of the outer peripheral side surface, the first honeycomb-shaped end surface, and the second honeycomb-shaped end surface of the segment joint body placed on the stand, an angle formed by the scraping spatula and the at least one surface when the scraping spatula is pressed against the at least one surface, and a speed at which the scraping spatula is moved in the at least one scraping direction along the at least one surface while being pressed against the at least one surface under predetermined conditions; and a step of drying the undried joining material after the step of scraping the joining material.

Figure 5:
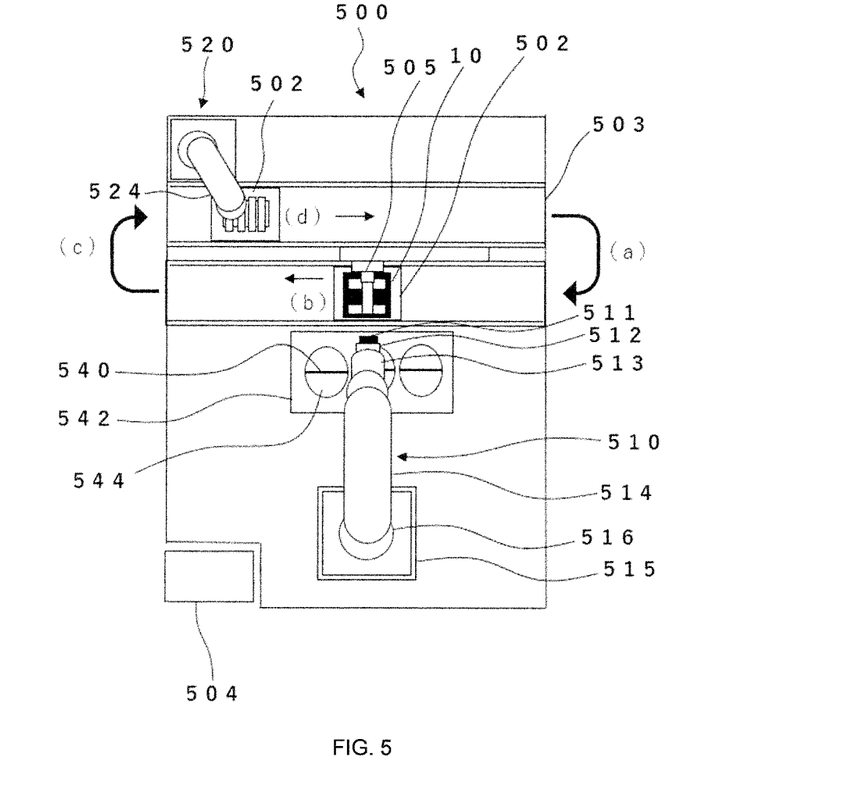
FIG. 5 is a schematic plan view of a scraping device for a joining material according to one embodiment of the present invention.
Figure 6:
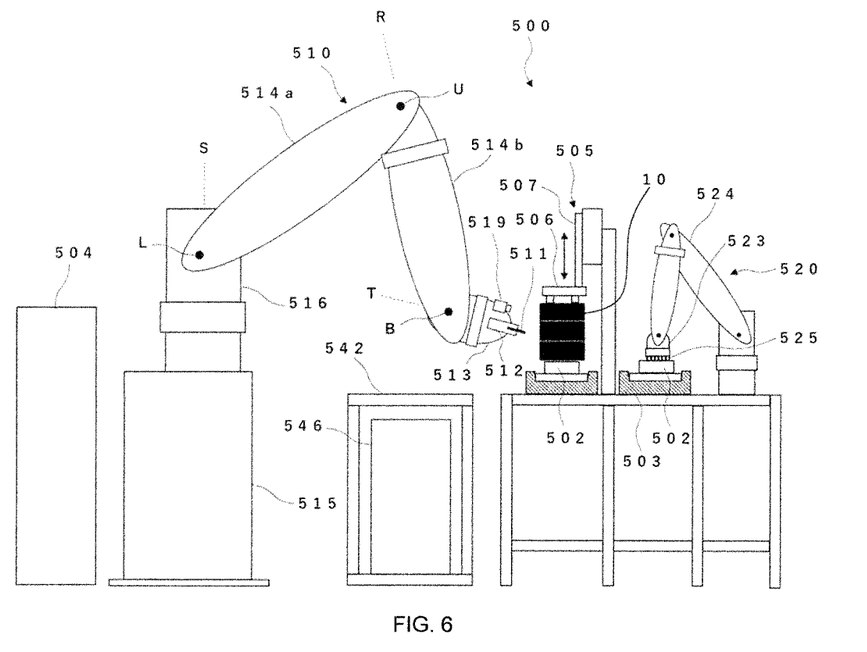
FIG. 6 is a schematic side view of a scraping device for a joining material according to one embodiment of the present invention.

FIG. 5 shows a schematic plan view of a scraping device 500 for the joining material according to one embodiment of the present invention. FIG. 6 shows a schematic side view of the scraping device 500 for the joining material according to one embodiment of the present invention. The scraping device 500 comprises a stand 502 for placing the segment joint body 10, a circulation traveling type conveyor 503 for transporting the stand 502, a controller 504, and a scraping robot 510 having at least one scraping spatula 511 configured to be movable in at least one scraping direction along at least one surface of the outer peripheral side surface, the first honeycomb-shaped end surface, and the second honeycomb-shaped end surface of the segment joint body 10 placed on the stand 502.

Further, the scraping device 500 comprises the scraping robot 510 which is configured such that a pressing load of the scraping spatula 511 against the at least one surface, an angle formed by the scraping spatula and the at least one surface when the scraping spatula is pressed against the at least one surface, and a speed at which the scraping spatula 511 is moved in the at least one scraping direction along the at least one surface while being pressed against the at least one surface can be controlled by the controller 504.

According to one embodiment, the scraping robot 510 is an articulated robot comprising a wrist portion 513 for attaching the scraping spatula 511, and an arm 514 with the wrist portion 513 attached to a tip of the arm 514. As an articulated robot, for example, an industrial robot such as a 6-axis vertical articulated robot or a 7-axis vertical articulated robot can be suitably used. The scraping robot 510 is configured such that by controlling postures of the wrist portion 513 and the arm 514, the coordinate at which the scraping spatula 511 is located, the pressing load, the angle, and the speed can be controlled by the controller 504.

The controller 504 may comprise, for example, an operation program for the scraping robot 510, an operation panel and/or a programming pendant for operating the scraping robot 510 or teaching the scraping robot 510 the conditions for performing the scraping operation, an arithmetic device composed of a processor such as a microprocessor that performs arithmetic processing to control the scraping robot 510, a memory and a storage unit, a current amplifier that controls the electric current that drives the motor, and an interface for exchanging information with peripheral devices.

According to one embodiment, the scraping robot 510 is configured so as to be able to move the scraping spatula 511 in the scraping direction such that a tip of the scraping spatula 511 extends in a direction perpendicular to the scraping direction. The shape of the scraping spatula 511 is not particularly limited, but it is preferably rectangular plate shape from the viewpoint of scraping efficiency.

Figure 8:
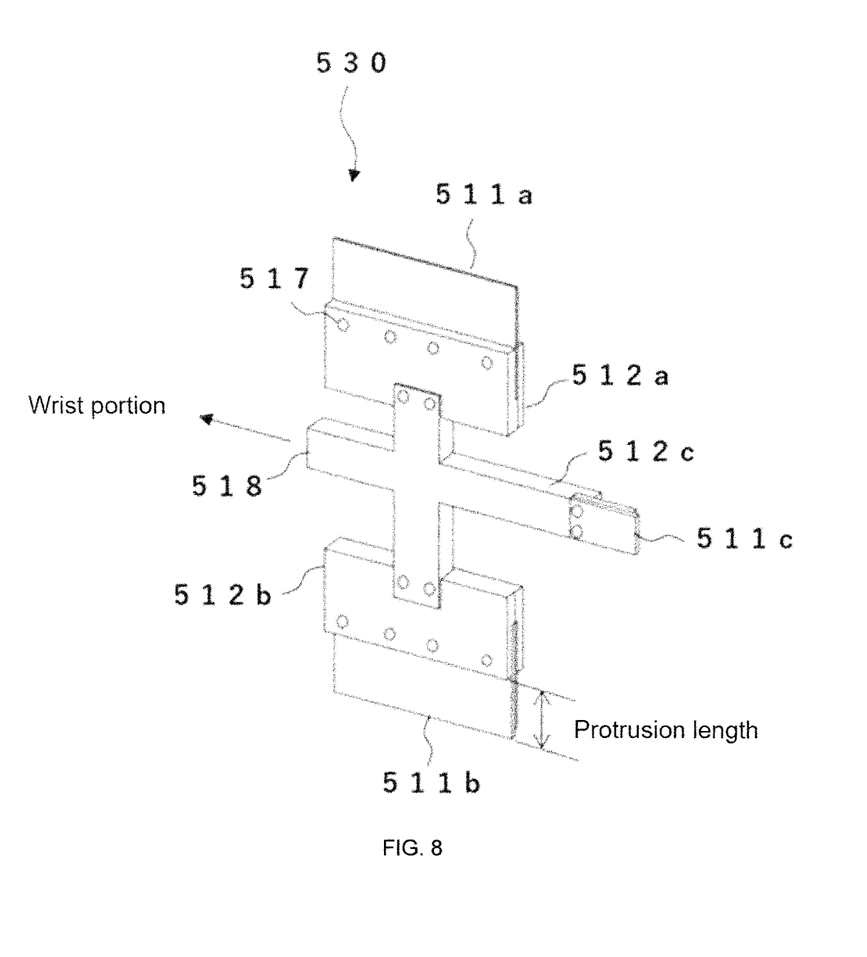
FIG. 8 is a schematic perspective view of an exemplary scraping spatula assembly comprising both a scraping spatula having a long scraping width and a scraping spatula having a short scraping width.

The scraping spatula 511 is preferably composed of rubber for the purpose of protecting the products and avoiding contamination. In particular, it is advantageously composed of rubber having a shore hardness of 20A to 90A, and desirably, a shore hardness of 20A to 40A for the first scraping spatula 511a described later, and a shore hardness of 70A to 90A for the second scraping spatula 511b described later, in terms of easy scraping of the joining material. Examples of the rubber include urethane rubber and silicon rubber. In the present specification, the shore hardness refers to a value measured by a type A durometer based on the JIS K6253-3: 2012 standard.

According to one embodiment, the scraping robot 510 comprises a holding portion 512 for fixing the scraping spatula 511, and the scraping spatula 511 protrudes from the holding portion in a rectangular plate shape. The material of the holding portion 512 is not particularly limited as long as it has a strength capable of stably fixing the scraping spatula 511. However, for example, carbon steel, aluminum, and stainless steel can be used. The method of fixing the scraping spatula 511 to the holding portion 512 is not limited, and examples thereof include a method of using a fixing tool 517 such as a screw or a bolt.

According to one embodiment, a protrusion length of the scraping spatula from the holding portion can be 40 mm to 80 mm. By setting the protruding length of the scraped spatula from the holding portion within the above range, there is an advantage that the scraped joining material can be retained. The protruding length from the holding portion of the scraping spatula can be preferably 50 mm to 80 mm. In the present specification, the protruding length of the scraping spatula from the holding portion is the length in the protruding direction of the scraping spatula from the position where the scraping spatula starts to protrude from the holding portion to the tip of the scraping spatula (see FIG. 8).

The scraping spatula 511 preferably has a thickness of 2 mm to 5 mm, and more preferably 2 mm to 3 mm, from the viewpoint of making the spatula adapt the change in the product shape. The thickness of the scraping spatula 511 refers to the thickness at the tip of the scraping spatula.

According to one embodiment, the scraping robot 510 comprises a pedestal 515, a base 516 installed on the pedestal 515 and rotatable around a first rotation axis S extending in the vertical direction, a lower arm 514a installed on the base 516 and rotatable around a second rotating axis L extending in the horizontal direction, an upper arm 514b installed at the tip of the lower arm 514a and rotatable around a third rotation axis U extending in the horizontal direction, and a wrist portion 513 installed on the tip side of the upper arm 514b and rotatable around a fourth rotation axis B extending in the horizontal direction. The scraping spatula 511 can be attached to the wrist portion 513.

According to one embodiment, the upper arm 514b is configured to be rotatable around a fifth rotation axis R extending in the longitudinal direction of the upper arm 514b. According to one embodiment, the wrist portion 513 is configured to be rotatable around a sixth rotation axis T extending from the fourth rotation axis B toward the tip of the scraping spatula 511.

The base, the arm, and the wrist portion can each be configured to be driven by an actuator such as a servomotor. In addition, the base, the arm, and the wrist can each be provided with a speed reducer, an encoder, and a transmission mechanism.

The stand 502 may be configured to be rotatable, for example, as a turntable. By configuring the stand 502 rotatable, the orientation of the segment joint body 10 placed on the stand 502 can be changed. For the position of the scraping robot 510, by accessing from only one direction, it is possible to carry out the operation of scraping the undried joining material protruding from the outer peripheral side surface, the first honeycomb-shaped end surface, and the second honeycomb-shaped end surface. The turntable may be driven by a motor so that the rotation angle can be electrically controlled. The orientation of the segment joint body 10 may be changed manually as well.

The scraping device 500 may comprise a press unit 505 for pressing and holding the segment joint body 10 placed on the stand 502 from the upper surface. The press unit 505 has, for example, an elevating cylinder 507 capable of moving the press portion 506 that applies pressure in contact with the segment joint body 10 in the Z direction (vertical direction), and can be configured so that the pressing force, the moving speed, the pressing time, and the height can be controlled by a servomotor.

The circulation traveling type conveyor 503 can convey the stand 502 in a circulating manner. The drive source of the circulation traveling type conveyor 503 can be, for example, a motor. By circulating the stand 502 with the circulation traveling type conveyor 503, it is possible to perform the scraping operation of the undried joining material protruding from the segment bonding body 10 by, for example, the following flow operation. Referring to FIG. 5, first, the segment joint body 10 is placed on the stand 502 at the starting point (a). The stand 502 is conveyed by the circulation traveling type conveyor 503 with the segment joint body 10 placed on it, and moves to a predetermined scraping position (b). At the scraping position (b), a predetermined scraping operation is performed by the scraping robot 510. After the scraping operation is completed, the stand 502 is further conveyed by the circulation traveling type conveyor 503 with the segment joint body 10 placed on it, and then the segment joint body 10 is unloaded from the stand 502 at the unloading position (c). The operation of unloading the segment joint body 10 from the stand 502 may be performed manually, or automatically by an industrial robot. The stand 502 from which the segment joint body 10 has been unloaded is further conveyed by the circulation traveling type conveyor 503 and returns to the starting point (a). Note that the illustration of the circulation traveling type conveyor 503 in the vicinity of (a) and the vicinity of (c) is omitted.

In order to effectively perform an operation of scraping the undried joining material protruding from the segment joint body, it is preferable that:

the pressing load of the scraping spatula against the at least one surface, the angle formed by the scraping spatula and the at least one surface when the scraping spatula is pressed against the at least one surface (the scraping spatula angle), and the speed at which the scraping spatula is moved in the at least one scraping direction along the at least one surface while being pressed against the at least one surface (the scraping speed)

can be controlled. In this respect, since the scraping robot 510 according to the present embodiment is configured to be able to control these conditions, it is possible to precisely control the conditions required for efficient scraping operation.

Figure 7A:
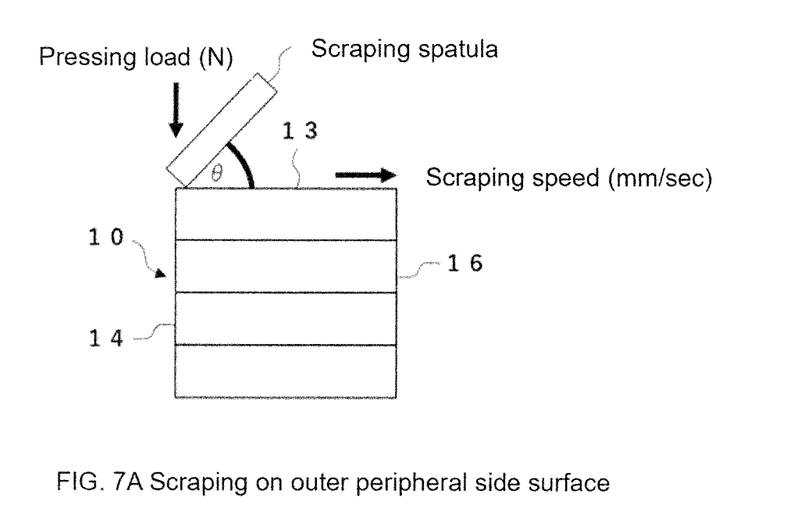
FIG. 7A conceptually shows the pressing load of the scraping spatula, the angle ($\theta$) of the scraping spatula, and the direction of the scraping speed (scraping direction) when the scraping operation is performed on an outer peripheral side surface.
Figure 7B:
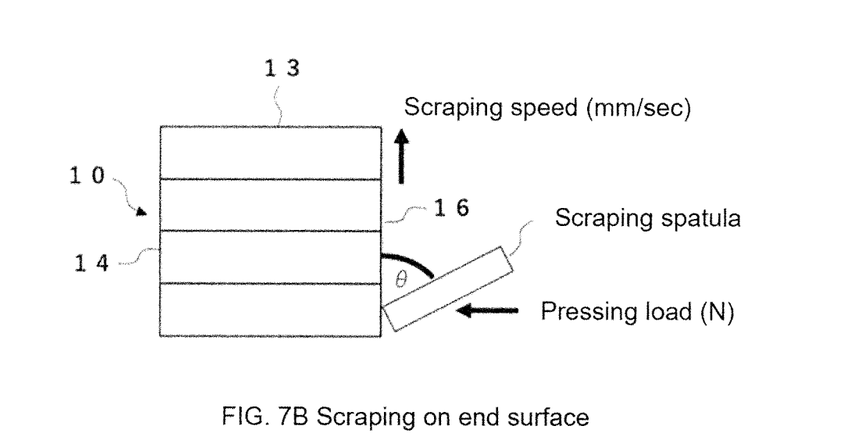
FIG. 7B conceptually shows the pressing load of the scraping spatula, the angle ($\theta$) of the scraping spatula, and the direction of the scraping speed (scraping direction) when the scraping work is performed on a honeycomb-shaped end surface.

FIG. 7A conceptually shows the pressing load of the scraping spatula, the angle ($\theta$) of the scraping spatula, and the direction of the scraping speed (scraping direction) when scraping operation is performed on an outer peripheral side surface. FIG. 7B conceptually shows the pressing load of the scraping spatula, the angle ($\theta$) of the scraping spatula, and the direction of the scraping speed (scraping direction) when scraping operation is performed on a honeycomb-shaped end surface. As can be understood from FIG. 7, the angle ($\theta$) of the scraping spatula refers to the angle, starting from the point where the scraping spatula contacts the at least one surface, formed by the first line segment extending in the direction of the scraping speed and the second line segment that is on the same plane as the first line segment and extending to the root of the scraping spatula.

The scraping operation can be effectively carried out by taking into consideration the dilatancy of the joining material. Specifically, it is preferable that the pressing load be 5 N to 40 N, the angle of the scraping spatula is 30° to 150°, and the scraping speed is 100 mm/sec to 500 mm/sec in the operation. By combining the pressing load, the angle of the scraping spatula, and the scraping speed within these ranges, there is an advantage that the leftover of the joining material can be reduced.

It is desirable to alter the pressing load, the angle of the scraping spatula, and the scraping speed according to the surface on which the scraping operation is performed from the viewpoint of reducing the leftover of the joining material. Specifically, when performing the operation of scraping the undried joining material on the first honeycomb-shaped end surface and the second honeycomb-shaped end surface, it is desirable that the pressing load is 30 N to 40 N, the angle of the scraping spatula is 60° to 70°, and the scraping speed is 100 mm/sec to 500 mm/sec in the operation.

Further, when the operation of scraping the undried joining material is carried out in a state where the segment joint body 10 is placed on the stand 502 so that the extending direction of the cells is horizontal, in the operation of scraping the undried joining material on the upper surface of the outer peripheral side surface, it is desirable that the pressing load is 5 N to 10 N, the angle of the scraping spatula is 30° to 150°, and the scraping speed is 100 mm/sec to 200 mm/sec.

Further, when the operation of scraping the undried joining material is carried out in a state where the segment joint body 10 is placed on the stand 502 so that the extending direction of the cells is horizontal, in the operation of scraping the undried joining material on the right or left side surface of the outer peripheral side surface, it is desirable that the pressing load is 5 N to 15 N, the angle of the scraping spatula is 30° to 150°, and the scraping speed is 100 mm/sec to 200 mm/sec.

The width of the tip of the scraping spatula 511 in the direction perpendicular to the scraping direction (the scraping width) is preferably equal to or longer than the maximum width of the first honeycomb-shaped end surface and the second honeycomb-shaped end surface in the direction perpendicular to the scraping direction. According to a preferred embodiment, the width of the tip of the scraping spatula 511 in the direction perpendicular to the scraping direction (the scraping width) is 100% to 120% of the maximum width of the first honeycomb-shaped end surface and the second honeycomb-shaped end surface in the direction perpendicular to the scraping direction.

When such a configuration is adopted, simply by moving the scraping spatula 511 in one direction, it is possible to perform the scraping operation on the entire surface of any of the outer peripheral side surface, the first honeycomb-shaped end surface, and the second honeycomb-shaped end surface of the segment joint body 10, which is efficient. Needless to say, the scraping operation on one surface may be performed only once, or may be performed a plurality of times if the scraping is insufficient. Further, the plurality of times of scraping operations may be performed in the same scraping direction or in various scraping directions. However, it is advantageous that the scraping directions include two directions that are orthogonal to each other because it is possible to reduce the scraping leftover of the joining material with a smaller number of scraping operations. For instance, the two directions that are orthogonal to each other may be a horizontal direction and a vertical direction.

However, if the scraping width of the scraping spatula is too long, it tends to be difficult to perform partial scraping operation when the scraping leftover is locally generated. Therefore, it is preferable that the scraping robot comprise a scraping spatula having a short scraping width, too. Specifically, it is preferable that the scraping spatula with a short scraping width have a width of its tip in the direction perpendicular to the scraping direction equal to or shorter than the maximum width of the first honeycomb-shaped end surface and the second honeycomb-shaped end surface of each of the pillar-shaped honeycomb structure segments constituting the segment joint body in the direction perpendicular to the scraping direction. According to a preferred embodiment, the scraping spatula with a short scraping width has a width of its tip in the direction perpendicular to the scraping direction of 70% to 100% of the maximum width of the first honeycomb-shaped end surface and the second honeycomb-shaped end surface of each of the pillar-shaped honeycomb structure segments constituting the segment joint body in the direction perpendicular to the scraping direction.

FIG. 8 shows a schematic perspective view of a scraping spatula assembly 530 comprising both a scraping spatula having a long scraping width and a scraping spatula having a short scraping width. The scraping spatula assembly 530 according to the illustrated embodiment comprises two types of scraping spatula, namely, a first scraping spatula 511a for scraping the undried joining material protruding on the first honeycomb-shaped end surface and the second honeycomb-shaped end surface, and a second scraping spatula for scraping the undried joining material protruding on the outer peripheral side surface. These two types of spatula (511a, 511b) have a long scraping width. Further, the scraping spatula 511 comprises a third scraping spatula 511c smaller than both the first scraping spatula 511a and the second scraping spatula 511b, and the width of the tip of the third scraping spatula 511c in the direction perpendicular to the scraping direction is equal to or shorter than the maximum width of the first honeycomb-shaped end surface and the second honeycomb-shaped end surface of each of the pillar-shaped honeycomb structure segments in the direction perpendicular to the scraping direction. From the viewpoint of preventing the other spatulas from contacting the surroundings, especially the segment joint body, when using one spatula, it is preferable to arrange the first scraping spatula 511a, the second scraping spatula 511b, and the third scraping spatula 511c such that the scraping spatulas protrude in different directions, for example, in directions in which they differ by 90° in the same plane.

The scraping spatula assembly 530 according to the illustrated embodiment comprises a first holding portion 512a for holding the first scraping spatula 511a, a second holding portion 512b for holding the second scraping spatula 511b, a third holding portion 512c for holding the third scraping spatula 511c for removing partially generated scraping leftover, and a connecting portion 518 to be attached to the wrist portion 513 of the scraping robot 510.

The scraping spatula for scraping the undried joining material protruding on the first honeycomb-shaped end surface and the second honeycomb-shaped end surface may also serve as the scraping spatula for scraping the undried joining material protruding on the outer peripheral side surface. However, as in the scraping spatula assembly 530 according to the illustrated embodiment, if the scraping spatula for scraping the undried joining material protruding on the first honeycomb-shaped end surface and the second honeycomb-shaped end surface is different from the scraping spatula for scraping the undried joining material protruding on the outer peripheral side surface, there is an advantage that damage to the products can be reduced.

According to one embodiment, the first scraping spatula 511a for scraping the undried joining material protruding on the first honeycomb-shaped end surface and the second honeycomb-shaped end surface can be different in terms of rubber hardness from the second scraping spatula 511b for scraping the undried joining material protruding on the outer peripheral side surface.

Referring to FIG. 6, according to one embodiment, the scraping device 500 comprises a camera configured to be able to capture at least one surface of the outer peripheral side surface, the first honeycomb-shaped end surface, and the second honeycomb-shaped end surface of the segment joint body 10 placed on the stand 502. The location of the camera 519 is not particularly limited, but it is advantageous to install the camera 519 on the wrist portion 513 because it is easy to capture the scraping leftover. In this case, the scraping robot 510 can be configured to be controlled by the controller 504 so as to discriminate a scraping leftover portion of the joining material on the at least one surface according to a predetermined standard based on an image of the at least one surface captured by the camera 519, and to perform an operation of scraping the undried joining material in the discriminated scraping leftover portion using the third scraping spatula.

When observing the image of the at least one surface, the scraping leftover portion of the joining material has a different color such as brightness from the portions without the scraping leftover portion of the joining material. Therefore, the discrimination of the scraping leftover portion may comprise, for example, a step in which the controller binarizes the image of the at least one surface with a predetermined threshold value and specifies the position of the scraping leftover portion of the joining material, and a step in which the controller instructs the scraping robot to perform a scraping operation using the third scraping spatula on the scraping leftover portion of the joining material based on the position information of the scraping leftover portion of the joining material. Based on the instruction, the scraping robot carries out the scraping operation using the third scraping spatula.

Referring to FIG. 5, according to one embodiment, the scraping device 500 comprises a wire 540 for rubbing off the joining material adhering to the scraping spatula 511. According to the illustrated embodiment, the wire 540 is erected across the opening 544 of the wire holder 542 arranged between the circulation traveling type conveyor 503 and the pedestal 515 of the scraping robot 510. Referring to FIG. 6, a container 546 for collecting the scraped joining material is provided below the wire 540. The joining material rubbed off from the scraping spatula 511 falls due to its own weight and is collected in the container 546. The recovered joining material can be reused as a joining material. In order to prevent the joining material recovered in the container 546 from drying and to facilitate reuse, it is preferable to humidify the air in the container 546. As a specific method of humidification, a method of connecting a humidifier in the container 546 can be mentioned.

According to one embodiment, the scraping robot 510 can be configured to be controlled by the controller 504 so as to perform an operation of rubbing the scraping spatula 511 against the wire 540. The wire is preferably thin so that the scraped joining material does not adhere to the wire and easily falls due to its own weight. Specifically, the diameter of the wire (referring to the equivalent circle diameter of the cross-section orthogonal to the direction in which the wire extends) is preferably 2 mm or less, and more preferably 1.5 mm or less. On the other hand, from the viewpoint of strength, the diameter of the wire is preferably 0.5 mm or more, and more preferably 1 mm or more. The material of the wire is not limited, but may be, for example, carbon steel or stainless steel.

According to one embodiment, the scraping robot 510 may comprise a cleaning robot 520 configured to be able to wipe a placement surface for the segment joint body of the stand 502 on the circulation traveling type conveyor 503 while pressing a wiping portion 525 against the placement surface. In this case, the stand 502 from which the segment joint body 10 has been unloaded can be wiped by the wiping portion 525 at a predetermined cleaning position (d) on the way back to the starting point. As a result, the joining material adhering to the stand 502 can be removed, and it is possible to prevent the segment joint body 10 to be placed next from being soiled with the joining material. Further, if the segment joint body 10 is placed on the stand 502 with the joining material adhered, the stacking position of the segment joint body 10 may vary. This can be prevented by removing the joining material adhering to the stand 502. The wiping portion 525 can be composed of, but not limited to, a sponge, a brush, a scrubbing brush, or the like. The length of the wiping portion 525 in the longitudinal direction perpendicular to the wiping direction is preferably made longer than the width of the placement surface of the stand 502 so that the entire placement surface of the stand 502 can be cleaned by one wiping motion.

Similar to the scraping robot, the cleaning robot 520 can also be composed of an industrial robot such as a 6-axis vertical articulated robot or a 7-axis vertical articulated robot. According to one embodiment, the cleaning robot 520 can be composed of an articulated robot comprising a wrist portion 523 with the wiping portion 525 attached, and an arm 524 with the wrist portion 523 attached to a tip of the arm 524. In the cleaning robot 520, by controlling postures of the wrist portion 523 and the arm 524, the coordinate at which the wiping portion 525 is located, the pressing load of the wiping portion 525 against the placement surface of the stand 502, and the movement speed of the wiping portion 525 can be controlled by the controller 504.

DESCRIPTION OF REFERENCE NUMERALS

10 Segment joint body
13 Outer peripheral side surface
14 First honeycomb-shaped end surface
16 Second honeycomb-shaped end surface
17 Joining material
18 Outer peripheral wall
20 Segment joint body
100 Pillar-shaped honeycomb structure segment
102 side surface
104 First honeycomb-shaped end surface
106 Second honeycomb-shaped end surface
108 First cell
110 Second cell
112 Partition wall
500 Scraping device
502 Stand
503 Circulation traveling type conveyor
504 Controller
505 Press unit
506 Press portion
507 Elevating cylinder
510 Scraping robot
511 (511a, 511b, 511c) Scraping spatula
512 (512a, 512b, 512c) Holding portion
513 Wrist portion
514 (514a, 514b) Arm
515 Pedestal
516 Base
517 Fixing tool
518 Connection portion
519 Camera
520 Cleaning robot
523 Wrist portion
524 Arm
525 Wiping portion
530 Scraping spatula assembly
540 Wire
542 Wire holder
544 Opening
546 Container

The invention claimed is:

1. A scraping device for an undried joining material protruding from a segment joint body in which side surfaces of a plurality of pillar-shaped honeycomb structure segments are joined via the undried joining material, the segment joint body having an outer peripheral side surface, a first honeycomb-shaped end surface, and a second honeycomb-shaped end surface located on an opposite side of the first honeycomb-shaped end surface,
the scraping device comprising:
a stand for placing the segment joint body;
a controller; and
a scraping robot comprising at least one scraping spatula configured to be movable in at least one scraping direction along at least one surface of the outer peripheral side surface, the first honeycomb-shaped end surface, and the second honeycomb-shaped end surface while being pressed against the at least one surface, the scraping robot being configured such that:
a pressing load of the scraping spatula against the at least one surface,
an angle formed by the scraping spatula and the at least one surface when the scraping spatula is pressed against the at least one surface, and
a speed at which the scraping spatula is moved in the at least one scraping direction along the at least one surface while being pressed against the at least one surface,
can be controlled by the controller.

2. The scraping device according to claim 1, wherein the pressing load is 5 N to 40 N, the angle is 30° to 150°, and the speed is 100 mm/sec to 500 mm/sec.

3. The scraping device according to claim 1, wherein the scraping spatula is made of a rubber having a shore hardness of 20 A to 90 A.

4. The scraping device according to claim 1, wherein the scraping spatula has a thickness of 2 mm to 5 mm.

5. The scraping device according to claim 1, wherein the scraping robot comprises a holding portion for fixing the scraping spatula, and the scraping spatula protrudes from the holding portion in a rectangular plate shape.

6. The scraping device according to claim 5, wherein a protrusion length of the scraping spatula from the holding portion is 40 mm to 80 mm.

7. The scraping device according to claim 1, wherein the scraping robot is able to move the scraping spatula in the at least one scraping direction such that a tip of the scraping spatula extends in a direction perpendicular to the at least one scraping direction.

8. The scraping device according to claim 1, wherein a width of a tip of the scraping spatula in a direction perpendicular to the scraping direction is equal to or longer than a maximum width of the first honeycomb-shaped end surface and the second honeycomb-shaped end surface in the direction perpendicular to the at least one scraping direction.

9. The scraping device according to claim 1, wherein the scraping spatula comprises a first scraping spatula for scraping the undried joining material protruding on the first honeycomb-shaped end surface and the second honeycomb-shaped end surface, and a second scraping spatula for scraping the undried joining material protruding on the outer peripheral side surface.

10. The scraping device according to claim 9, wherein the scraping spatula comprises a third scraping spatula smaller than both the first scraping spatula and a second scraping spatula, and a width of a tip of the third scraping spatula in the direction perpendicular to the at least one scraping direction is equal to or shorter than a maximum width of the first honeycomb-shaped end surface and the second honeycomb-shaped end surface of each of the pillar-shaped honeycomb structure segments in the direction perpendicular to the at least one scraping direction.

11. The scraping device according to claim 10, further comprising a camera configured to be able to capture at least one surface of the outer peripheral side surface, the first honeycomb-shaped end surface, and the second honeycomb-shaped end surface of the segment joint body placed on the stand,
wherein the scraping robot can be controlled by the controller so as to determine a scraping leftover portion of the joining material on the at least one surface according to a predetermined standard based on an image of the at least one surface captured by the camera, and to perform an operation of scraping the undried joining material in the determined scraping leftover portion using the third scraping spatula.

12. The scraping device according to claim 1, wherein the scraping robot is an articulated robot comprising a wrist portion for attaching the scraping spatula, and an arm with the wrist portion attached to a tip of the arm, and the scraping robot is configured such that by controlling postures of the wrist portion and the arm, a coordinate at which the scraping spatula is located, the pressing load, the angle, and the speed can be controlled by the controller.

13. The scraping device according to claim 1, further comprising a wire for rubbing off joining material adhering to the scraping spatula,
   wherein the scraping robot can be controlled by the controller so as to perform an operation of rubbing the scraping spatula against the wire.

14. The scraping device according to claim 1, wherein the stand is configured to be rotatable.

15. The scraping device according to claim 1, wherein the at least one scraping direction includes two directions orthogonal to each other.

16. The scraping device according to claim 1, further comprising a circulation traveling type conveyor for transporting the stand.

17. The scraping device according to claim 16, further comprising a cleaning robot having a wiping portion configured to be able to wipe a placement surface of the stand on a circulation travel-type conveyor while pressing the wiping portion against the placement surface.

18. A method for manufacturing a segment joint body, comprising:
   a step of placing on a stand a segment joint body in which side surfaces of a plurality of pillar-shaped honeycomb structure segments are joined via an undried joining material, the segment joint body having an outer peripheral side surface, a first honeycomb-shaped end surface, and a second honeycomb-shaped end surface located on an opposite side of the first honeycomb-shaped end surface;
   a step of scraping the undried joining material protruding from the segment joint body using the scraping device according to any one of claims 1 to 17 to control a pressing load of the scraping spatula against at least one surface of the outer peripheral side surface, the first honeycomb-shaped end surface, and the second honeycomb-shaped end surface of the segment joint body placed on the stand, an angle formed by the scraping spatula and the at least one surface when the scraping spatula is pressed against the at least one surface, and a speed at which the scraping spatula is moved in the at least one scraping direction along the at least one surface while being pressed against the at least one surface under predetermined conditions; and
   a step of drying the undried joining material after the step of scraping the joining material.

\* \* \* \* \*